(12) United States Patent
Ubaldo et al.

(10) Patent No.: US 10,744,834 B2
(45) Date of Patent: Aug. 18, 2020

(54) SWIVEL BEARING FOR THE INDEPENDENT WHEEL SUSPENSION OF A FRONT WHEEL

(71) Applicant: VOLKSWAGEN AG, Wolfsburg (DE)

(72) Inventors: Mario Ubaldo, Wolfsburg (DE); Thomas Paulsen, Wolfsburg (DE)

(73) Assignee: Volkswagen AG (DE)

( * ) Notice: Subject to any disclaimer, the term of this patent is extended or adjusted under 35 U.S.C. 154(b) by 680 days.

(21) Appl. No.: 15/480,777

(22) Filed: Apr. 6, 2017

(65) Prior Publication Data

US 2017/0297397 A1 Oct. 19, 2017

(30) Foreign Application Priority Data

Apr. 14, 2016 (DE) .................. 10 2016 206 284

(51) Int. Cl.
| | | |
|---|---|---|
| B60G 7/02 | (2006.01) | |
| B62D 7/18 | (2006.01) | |
| B60G 3/06 | (2006.01) | |
| B60G 3/20 | (2006.01) | |
| B60G 7/00 | (2006.01) | |
| B62D 9/00 | (2006.01) | |

(52) U.S. Cl.
CPC .............. B60G 7/02 (2013.01); B60G 3/06 (2013.01); B60G 3/20 (2013.01); B60G 7/001 (2013.01); B62D 7/18 (2013.01); B62D 9/00 (2013.01); *B60G 2200/14* (2013.01); *B60G 2200/142* (2013.01); *B60G 2200/44* (2013.01); *B60G 2204/143* (2013.01); *B60G 2206/016* (2013.01); *B60G 2206/50* (2013.01)

(58) Field of Classification Search
CPC . B60G 7/02; B60G 7/001; B60G 3/20; B60G 2204/143; B60G 2200/14; B60G 2200/44; B60G 2206/016; B60G 2206/50; B62D 7/18
See application file for complete search history.

(56) References Cited

U.S. PATENT DOCUMENTS

| | | | | |
|---|---|---|---|---|
| 4,364,288 A | * | 12/1982 | Castoe | ............... B25B 27/0035 81/488 |
| 4,577,534 A | * | 3/1986 | Rayne | ................. B25B 27/0035 280/86.755 |
| 4,753,462 A | * | 6/1988 | Liu | ....................... F16B 7/1418 285/420 |
| 4,957,388 A | * | 9/1990 | Liu | ........................ B62K 19/36 403/272 |
| 8,857,555 B2 | * | 10/2014 | Paintmayer | .............. B60G 7/02 180/274 |

(Continued)

FOREIGN PATENT DOCUMENTS

| | | |
|---|---|---|
| DE | 102012021269 A1 | 4/2014 |
| DE | 102012024145 A1 | 6/2014 |

*Primary Examiner* — Jonathan P Masinick
(74) *Attorney, Agent, or Firm* — Barnes & Thornburg LLP

(57) ABSTRACT

A pivot bearing for independent wheel suspension of a steerable front wheel of a vehicle having at least one upper bearing with a connection to a spring strut for attachment to the body. To improve the safety of the passenger cell in the event of a frontal collision, the connection has a separating device that brings about separation of the attachment of the pivot bearing to the spring strut and to the body of the vehicle at the upper bearing in the event of a frontal impact.

6 Claims, 7 Drawing Sheets

(56) References Cited

U.S. PATENT DOCUMENTS

| | | | | |
|---|---|---|---|---|
| 8,870,205 B2* | 10/2014 | Corby | ............... | B60G 7/02 |
| | | | | 280/124.134 |
| 9,022,403 B2* | 5/2015 | Lam | ............... | B60G 7/02 |
| | | | | 280/124.1 |
| 2002/0180171 A1* | 12/2002 | Hasebe | ............... | B60G 7/02 |
| | | | | 280/124.134 |
| 2015/0307133 A1* | 10/2015 | Mentzel | ............... | B60G 13/005 |
| | | | | 280/784 |
| 2016/0009153 A1* | 1/2016 | von Hasselbach | .. | B60G 13/005 |
| | | | | 280/124.125 |

* cited by examiner

SWIVEL BEARING FOR THE INDEPENDENT WHEEL SUSPENSION OF A FRONT WHEEL

PRIORITY CLAIM

This patent application claims priority to German Patent Application No. 10 2016 206 284.0, filed 14 Apr. 2016, the disclosure of which is incorporated herein by reference in its entirety.

SUMMARY

Illustrative embodiments relate to a pivot bearing for independent wheel suspension of a steerable front wheel of a vehicle, which has at least one upper bearing with a connection to a spring strut for attachment to the body.

BRIEF DESCRIPTION OF THE DRAWINGS

Disclosed embodiments are explained below with reference to the figures, of which.

DETAILED DESCRIPTION

Figure 1:
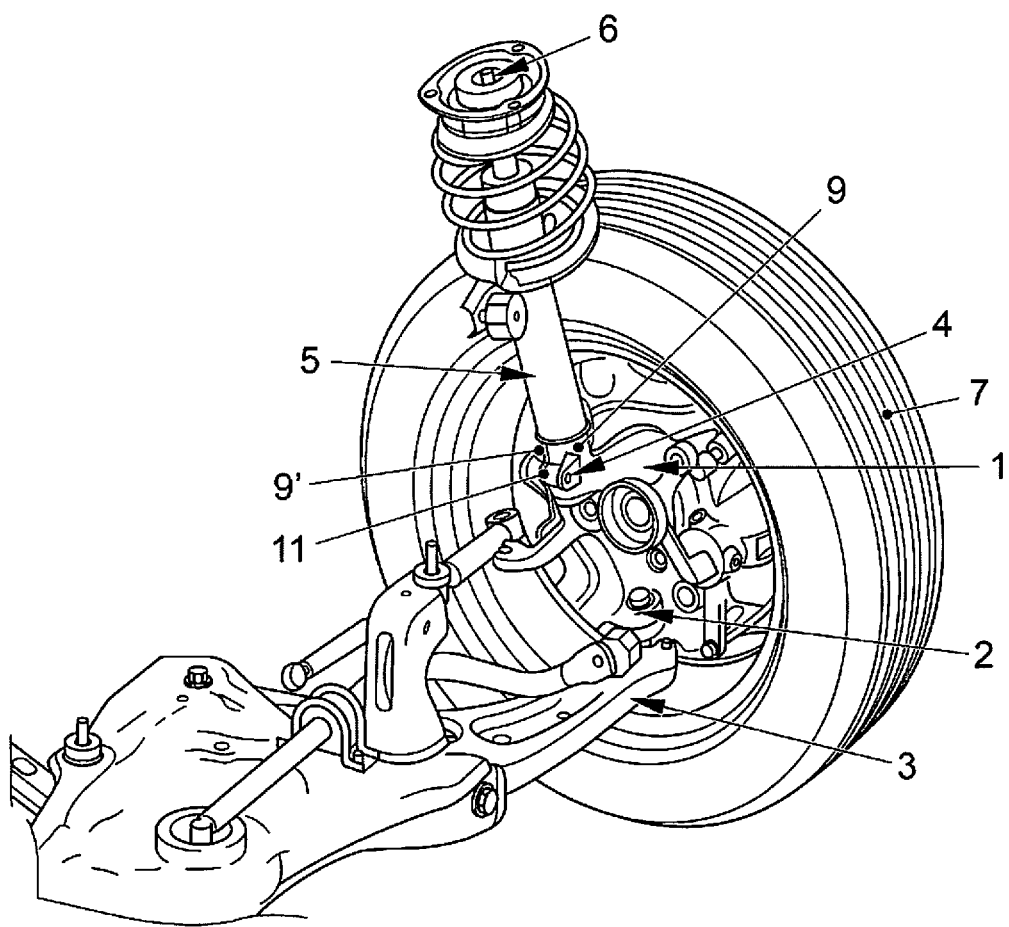
FIG. 1 shows a schematic illustration of an independent wheel suspension (prior art)

The prior art discloses various front wheel suspensions, which have various forms of attachment to the body of the vehicle. DE 10 2012 021 269 A1, for example, discloses an independent wheel suspension comprising an upper wishbone, which has a link situated toward the front of the vehicle and a link situated toward the rear of the vehicle, and a lower wishbone. By means of this independent wheel suspension, the front wheel is connected, together with a respective axle support and a spring strut, to the running gear of the front end structure. To partially detach the wheel from the body in the event of an at least partially overlapping frontal collision and thus avoid intrusion (penetration) of the wheel into the passenger cell, at least one of the links has a separating device, while at least one remaining link brings about turning (pivoting) of the wheel by its deformation during the impact, ensuring that the wheel avoids the body.

In a comparable way, DE 10 2012 024 145 discloses a device for protecting a passenger vehicle, having a protection element by means of which it is possible to bring about controlled movement of a bearing part of the wheel suspension as a result of a frontal collision, thus ensuring that the wheel is guided past the side of the passenger cell in the event of a collision.

In the case of wheel suspensions in which the wheel or the wheel carrier is attached to the body of the vehicle via a spring strut, the known safety devices have proven to be in need of improvement because the relatively strong attachment of the wheel to the spring strut prevents the wheel from being guided past the passenger cell in the event of a collision. Moreover, the rearward-pivoting spring strut pulls on the spring strut turret, leading to the water reservoir of the vehicle arranged thereabove and the upper region of the A-pillar being pushed in the direction of the passenger cell. Finally, the strong connection between the wheel and the spring strut brings about massive deformations in the body, and these should be avoided, especially in the region of the passenger cell.

Disclosed embodiments propose a pivot bearing for the independent wheel suspension of a front wheel, by means of which the abovementioned drawbacks are eliminated.

Disclosed embodiments provide a pivot bearing, the connection of which to the spring strut has a separating device, which brings about separation of the attachment of the pivot bearing to the spring strut and thus to the body of the vehicle at the upper bearing in the event of a frontal impact.

By means of the selective failure of the connection between the pivot bearing and the spring strut, the movement of the wheel relative to the body during the impact is influenced, and the body is relieved of loads, ensuring that the passenger cell and the occupants are subject to lower stresses. The formation of a block consisting of the hard components of the wheel (brake system, rim) and the body (sill and floor) is avoided, thus enabling the wheel to avoid the body during the impact, relieving the loads on the lower region of the A-pillar, the sill and the floor. The tensile loads on the spring strut or the spring strut turret are likewise reduced, thus very largely avoiding or at least reducing additional displacement of the water reservoir and/or of the upper region of the A-pillar in the direction of the passenger cell.

Disclosed embodiments are specified below.

According to a first disclosed embodiment, it is envisaged that the connection is a clamping connection, in particular, a cylindrical or unilaterally slotted clamping connection, the levers of which surround and firmly clamp the spring strut over a certain area. For this purpose, the ends of the levers are connected to lugs, through which screws pass to transmit the clamping forces. Such a clamping connection has proven desirable in combination with a separating device because it is a simple matter to arrange a separating device at the various locations of the clamping connection without simultaneously affecting the strength of the connection during the normal operation of the vehicle.

To ensure that the separating device can bring about selective failure of the connection between the pivot bearing and the spring strut, it is envisaged, according to a disclosed embodiment, that at least a) one of the lugs and/or
b) one of the levers of the clamping connection and/or
c) one of the screws has a predetermined breaking point, which is broken open by the separating device to separate the attachment of the pivot bearing to the spring strut or the body of the vehicle at the upper bearing in the event of a frontal impact.

According to another disclosed embodiment, the separating device is designed as a bolt ("crash bolt"), which is connected at least indirectly to one of the lugs of the clamping connection and brings about the breaking open of the predetermined breaking point in the event of a frontal impact by colliding with a) the body of the vehicle and/or
    b) an impact plate arranged thereon and/or
    c) the wheel rim and/or
    d) the barrier.

Here, the bolt can be connected integrally or in a two-piece configuration to one of the screws which pass through the lugs of the clamping connection to transmit the clamping forces. As an alternative, it is also possible for the separating device to be designed as an angled profile, which may be clamped by the screwed joint of the clamping connection or is connected integrally to the pivot bearing. Both the bolt and the profile should be embodied so as to be stiff in bending to avoid bending of the bolt/profile since otherwise breakage of the predetermined breaking points is not assured. In the case of the angled profile, twisting about the longitudinal axis of the connecting screw should furthermore be avoided.

To bring about complete separation of the attachment of the pivot bearing and hence of the wheel to the body of the vehicle in the event of a frontal impact, it is envisaged, according to another disclosed embodiment, that the pivot bearing has a lower bearing (U2 bearing) for attachment of the pivot bearing to the body, the bearing likewise having a predetermined breaking point, which is broken open in the event of a frontal impact.

FIG. 1 shows a conventional independent wheel suspension in accordance with the prior art, in which a pivot bearing 1 is connected via a lower bearing 2 ("U2 bearing") to a wishbone 3 and to the body of a vehicle (not shown). The upper point of attachment to the body is formed by a clamping device 4 associated with the spring strut 5, which is connected to the body via a spring strut turret 6. In the illustrative embodiment shown, the clamping connection 4 is a unilaterally slotted clamping connection 4, the levers 9, 9' of which surround and firmly clamp the spring strut 5. For this purpose, the ends of the levers 9, 9' are connected to lugs, through which at least one screw 11 passes to transmit the clamping forces. The pivot bearing 1 furthermore has a wheel carrier, which is connected to a wheel 7. In the event of a collision with a barrier, at least the upper attachment of the wheel 7 to the spring strut 5 is so strong in the case of a conventional pivot bearing that the wheel 7 is not released from the attachment and, in the worst case, penetrates into the passenger cell (not shown), which can lead to considerable personal injuries.

Figure 2:
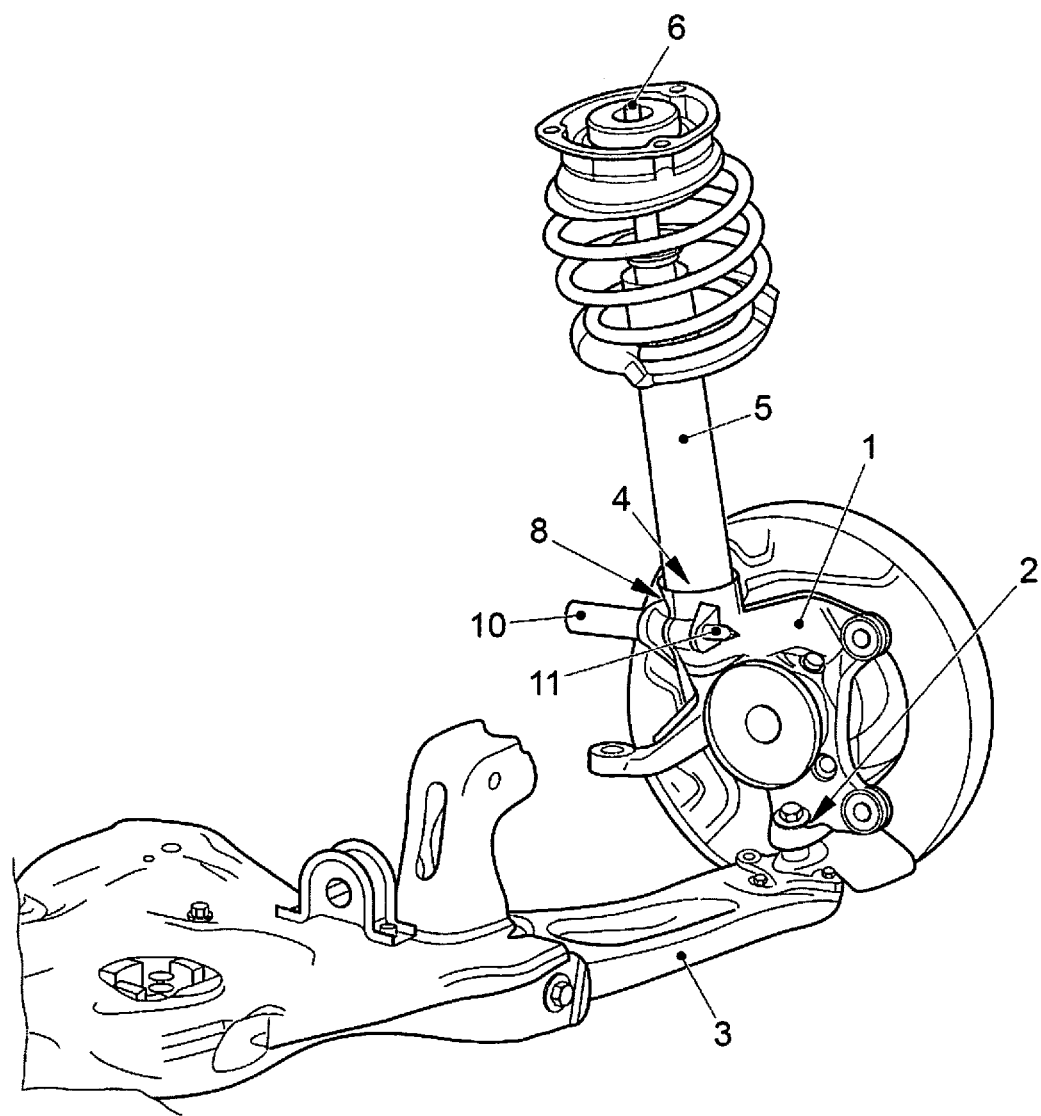
FIG. 2 shows an independent wheel suspension having a separating device.

FIG. 2 shows an independent wheel suspension according to a first illustrative embodiment, according to which the connection between the pivot bearing 1 and the spring strut 5 has a separating device 8, which brings about separation of the pivot bearing 1 from the upper body attachment in the event of a collision, thus effectively avoiding intrusion of the wheel 7 into the passenger cell. In the illustrative embodiment shown, the separating device 8 is a bolt 10 ("crash bolt"), which is connected integrally to the screw 11. The bolt 10 is arranged and aligned in such a way that it collides with a partial area of the body, the rim of the wheel 7 or an impact plate (not shown) in the event of a collision, leading to the breaking open of a predetermined breaking point (not shown in FIG. 2) at the clamping device 4.

Figure 3A:
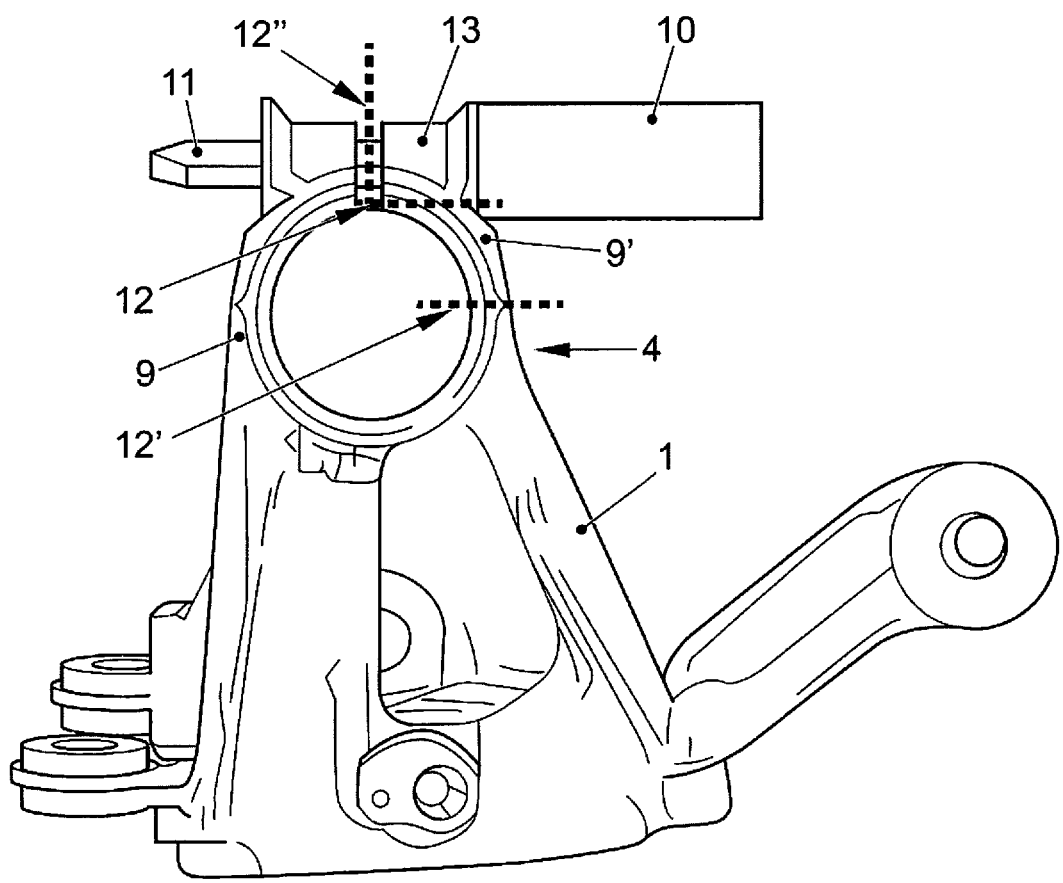
FIG. 3a shows one view of a separating device on a pivot bearing.

FIG. 3a shows, by way of example, different predetermined breaking points 12, 12', 12" on the clamping connection 4. The predetermined breaking point 12 is arranged directly at the transition between the lug 13 of a lever 9' of the clamping connection 4 and the lever 9' itself. As an alternative or in addition, a second predetermined breaking point 12' is provided, which is arranged on the lever 9'. The screw 11 can furthermore also have a predetermined breaking point 12".

Figure 3B:
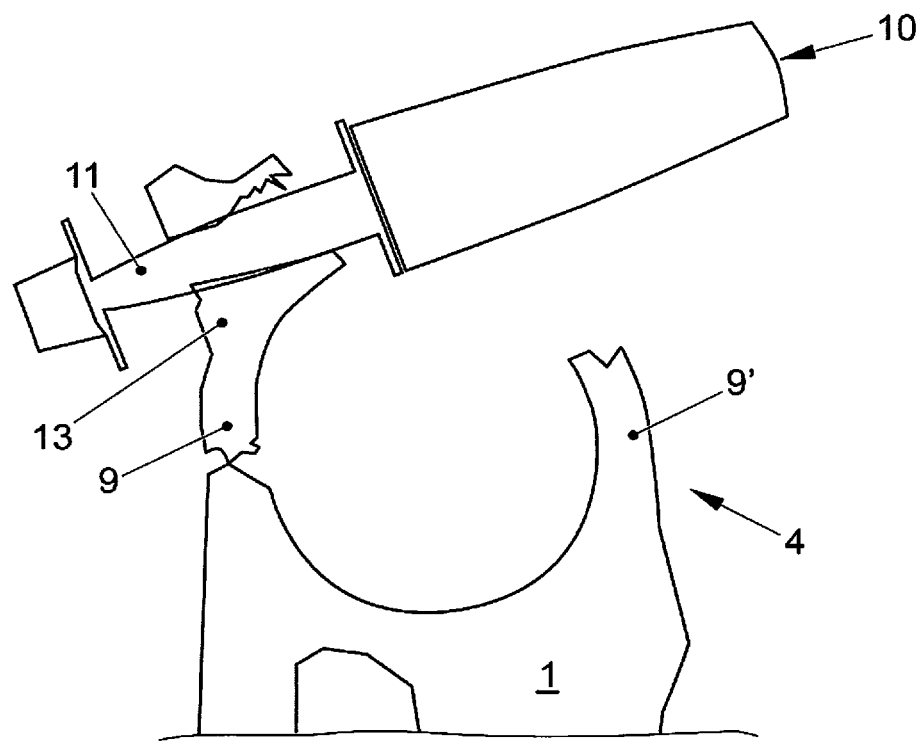
FIG. 3b shows a second view of a separating device on a pivot bearing.
Figure 3C:
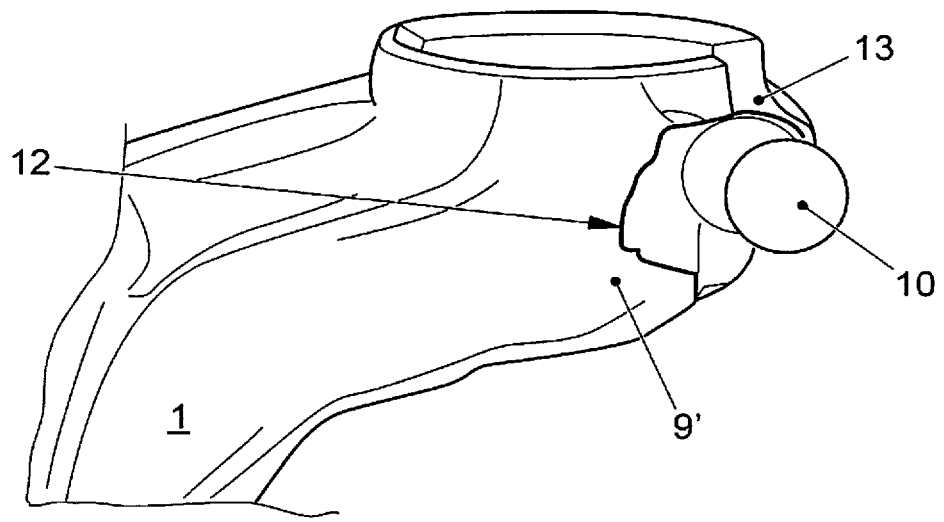
FIG. 3c shows a third view of a separating device on a pivot bearing.

FIG. 3c shows the path of the predetermined breaking point 12 in the transitional region between the lug 13 and the lever 9'. FIG. 3b shows the predetermined breaking point 12 in the broken-open state.

Figure 4A:
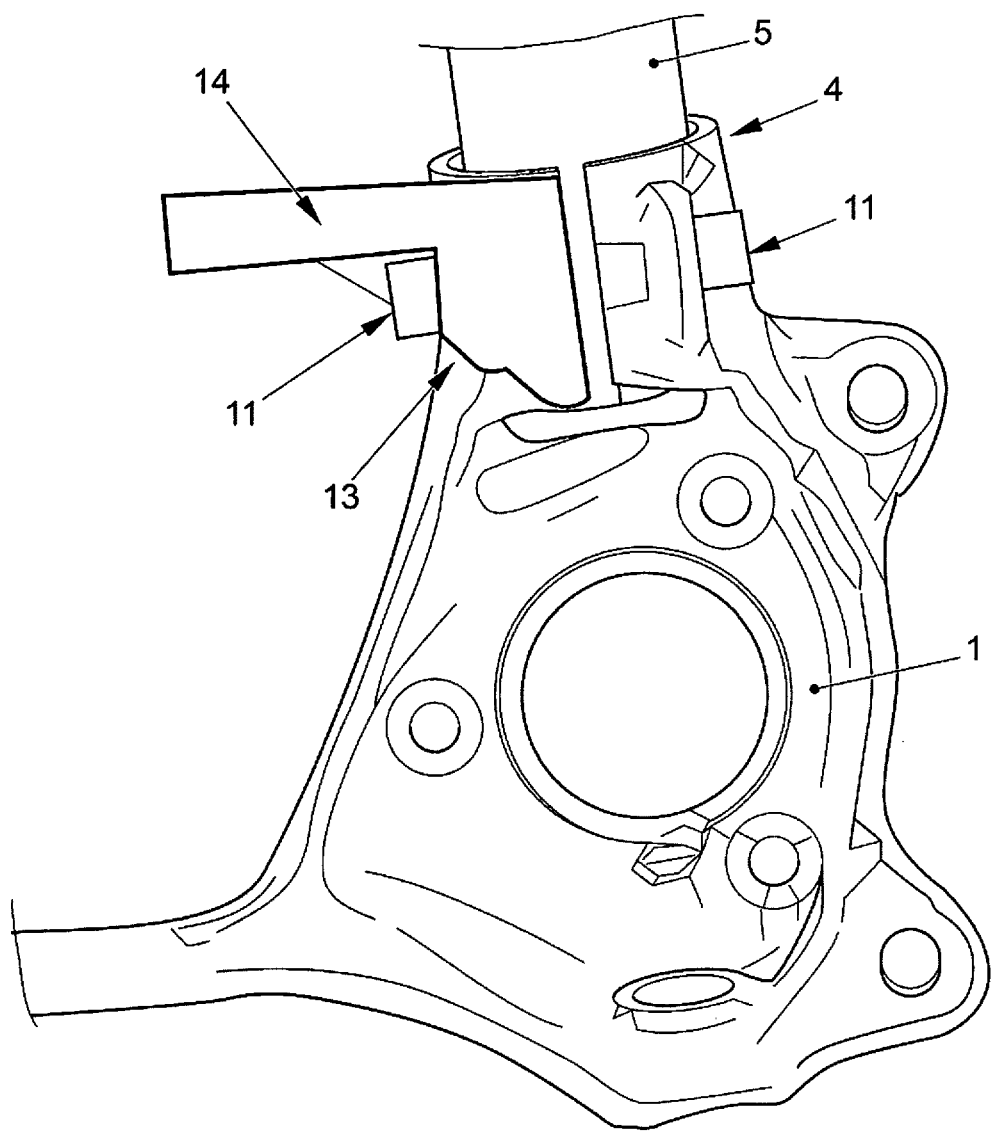
FIG. 4a shows one view of an angled profile as a separating device.
Figure 4B:
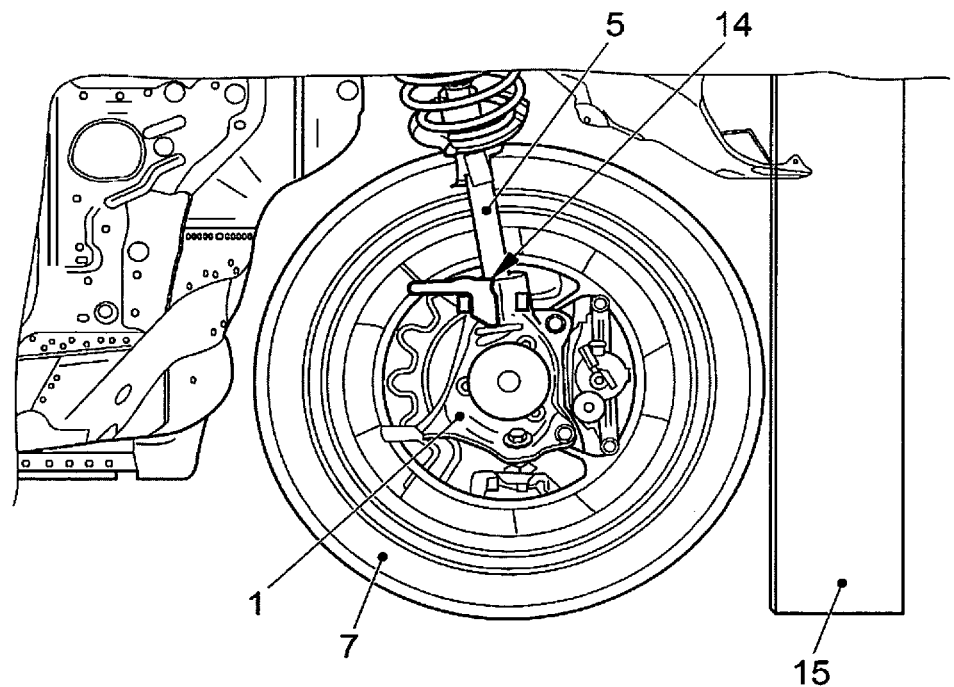
FIG. 4b shows a second view of an angled profile as a separating device.
Figure 4C:
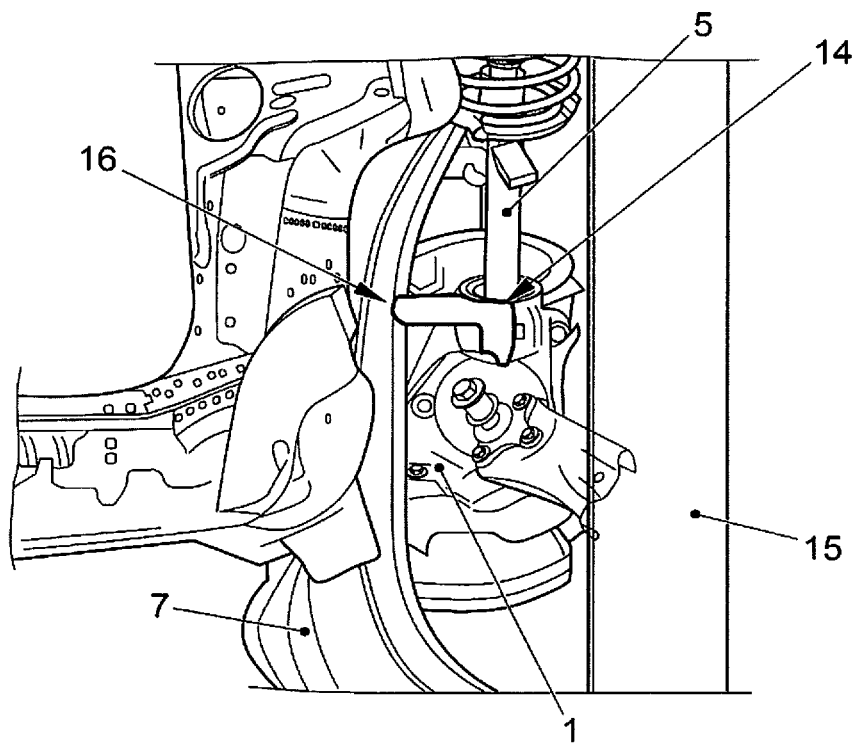
FIG. 4c shows a third view of an angled profile as a separating device.

FIG. 4a shows the separating device 8 as an angled profile 14, which is supported in positive engagement between the screw 11 and the lug 13 of the clamping connection 4. FIG. 4b shows the angled profile 14 shortly before the vehicle collides with a barrier 15. After the collision (FIG. 4c), the angled profile 14 strikes a partial area of the body and/or rim (arrow 16), leading to the breaking open of one of the predetermined breaking points 12, 12', 12" and consequently to the separation of the attachment of the wheel 7 to the upper suspension.

Figure 5A:
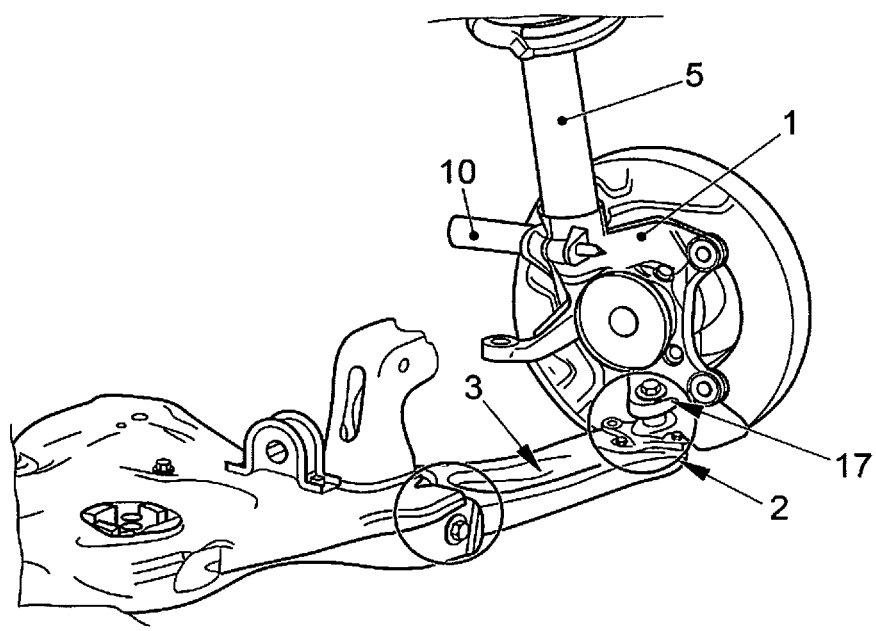
FIG. 5a shows one view of an independent wheel suspension having a predetermined breaking point at the lower bearing.
Figure 5B:
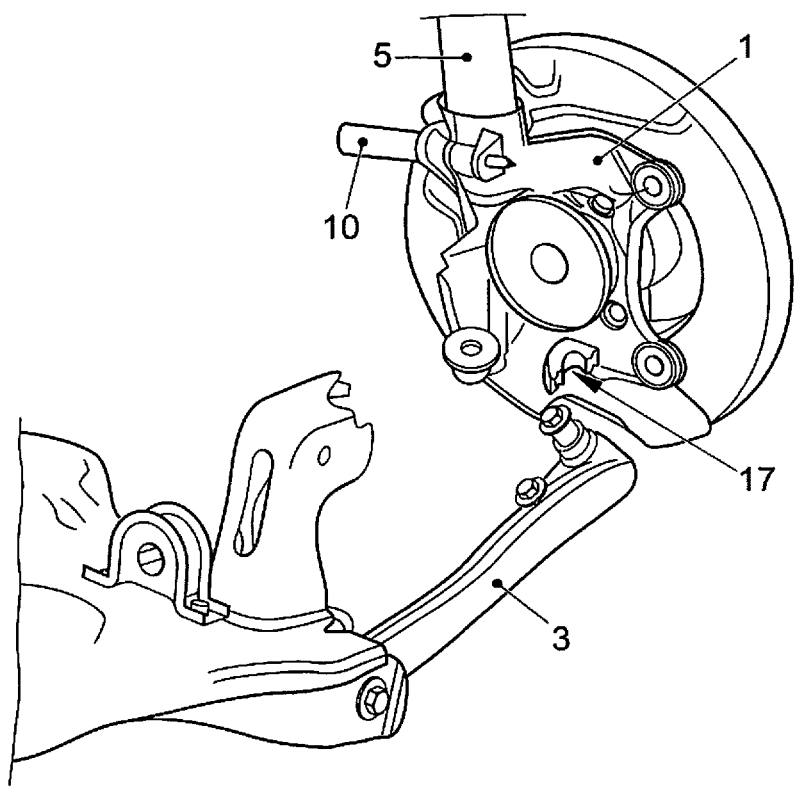
FIG. 5b shows a second view of an independent wheel suspension having a predetermined breaking point at the lower bearing.

Finally, FIGS. 5a and b show the breaking open of another predetermined breaking point 17 at the lower bearing 2, which leads, in the case of simultaneous breaking open at the upper bearing, to the complete separation of the wheel from the attachment to the body. FIG. 5a shows an undamaged lower bearing 2, while the lower bearing 2 is shown with a broken-open predetermined breaking point 17 in FIG. 5b.

The invention claimed is:

1. A pivot bearing for independent wheel suspension of a steerable front wheel of a vehicle the pivot bearing comprising:

at least one upper bearing having a connection to a spring strut wherein the spring strut is configured for attachment to a vehicle body;

the connection of the upper bearing to the spring strut including a separating device, which separates the attachment of the at least one upper bearing to the spring strut in response to a frontal impact to the vehicle, thereby, detaching the pivot bearing from the vehicle;

wherein the connection is a clamp connection, the clamp connection having levers configured to surround the spring strut at least partially and wherein ends of the levers are connected to lugs, the lugs configured for at least one screw to pass through, and wherein at least one of the lugs and/or levers has a predetermined breaking point configured to break open by action of the separating device to separate the attachment of the upper bearing to the spring strut in response to the frontal impact.

2. The pivot bearing of claim 1 further comprising the at least one screw, wherein at least one of the screws has a predetermined breaking point, which is broken open by the separating device to separate the attachment of the at the upper bearing to the spring strut in response to the frontal impact.

3. The pivot bearing of claim 1 wherein the separating device is a bolt, which is connected at least indirectly to one of the lugs of the clamping connection and brings about the breaking open of the predetermined breaking point in response to a frontal impact by colliding with the vehicle body and/or an impact plate arranged thereon and/or the wheel rim and/or the barrier.

4. The pivot bearing of claim 3 wherein the bolt is connected integrally or in a two-piece configuration to one of the screws which pass through the lugs of the clamping connection to transmit the clamping forces.

5. The pivot bearing of claim 1 wherein the separating device is an angled profile, which is clamped by a screwed joint of the clamping connection or is connected integrally to the upper bearing.

6. The pivot bearing of claim 1 further comprising a lower bearing for attachment of the pivot bearing to the vehicle body, the lower bearing having a predetermined breaking point which, when met, allows for a complete separation of the attachment of the pivot bearing to the vehicle body in response to a frontal impact.

* * * * *